United States Patent
Torgue et al.

(10) Patent No.: US 12,100,528 B2
(45) Date of Patent: Sep. 24, 2024

(54) METHOD FOR PREPARING AT LEAST ONE GENERATOR WITH A HIGH RADIUM-228 CONTENT

(71) Applicant: ORANO MED, Chatillon (FR)

(72) Inventors: Julien Torgue, Gaithersburg, MD (US); Rémy Dureau, Saint-Gence (FR)

(73) Assignee: ORANO MED, Chatillon (FR)

( * ) Notice: Subject to any disclaimer, the term of this patent is extended or adjusted under 35 U.S.C. 154(b) by 693 days.

(21) Appl. No.: 17/293,139

(22) PCT Filed: Nov. 8, 2019

(86) PCT No.: PCT/FR2019/052675
§ 371 (c)(1),
(2) Date: May 12, 2021

(87) PCT Pub. No.: WO2020/099769
PCT Pub. Date: May 22, 2020

(65) Prior Publication Data
US 2022/0013246 A1     Jan. 13, 2022

(30) Foreign Application Priority Data
Nov. 15, 2018    (FR) ........................................ 1860561

(51) Int. Cl.
*G21G 4/08*     (2006.01)
*B01D 15/18*    (2006.01)
*G21G 1/00*     (2006.01)

(52) U.S. Cl.
CPC ........... *G21G 4/08* (2013.01); *B01D 15/1871* (2013.01); *G21G 1/0005* (2013.01)

(58) Field of Classification Search
None
See application file for complete search history.

(56) References Cited

U.S. PATENT DOCUMENTS

2004/0052705 A1 * 3/2004 Tranter .................... G21G 4/08
                                                              423/11
2006/0153760 A1   7/2006 Meikrantz et al.
(Continued)

FOREIGN PATENT DOCUMENTS

EP    3174068 A1 *  5/2017 ............. B01D 15/20
WO    0205859 A2    1/2002
(Continued)

OTHER PUBLICATIONS

International Search Report for PCT/FR2019/052675 dated Mar. 12, 2020.
(Continued)

*Primary Examiner* — Sheng H Davis
(74) *Attorney, Agent, or Firm* — Pearne & Gordon LLP

(57) ABSTRACT

A method for preparing one or more generators with a high radium-228 content from an aqueous solution comprising thorium-232 and radium-228. The generator(s) can be used, in particular, for producing thorium-228, from which radium-224, then lead-212 and bismuth-212 can be obtained. The method and the generator(s) that it can be used to prepare are therefore applicable, in particular, in the manufacture of radiopharmaceuticals made from lead-212 or bismuth-212, which can be used in nuclear medicine and, in particular, in targeted alpha radiotherapy for the treatment of cancers.

22 Claims, 3 Drawing Sheets

(56) References Cited

U.S. PATENT DOCUMENTS

2006/0213329 A1* 9/2006 Meikrantz ............... G21G 4/00
   75/393
2015/0170776 A1   6/2015 Torgue et al.
2018/0308600 A1   10/2018 Torgue et al.

FOREIGN PATENT DOCUMENTS

| WO | WO-03065381   A1 * | 8/2003 | ............... G21F 9/00 |
| WO | WO-2008108888 A2 * | 9/2008 | .............. B01J 41/08 |
| WO | WO-2008113792 A2 * | 9/2008 | .............. A61K 51/10 |

OTHER PUBLICATIONS

Written Opinion for PCT/FR2019/052675 dated Mar. 12, 2020.
Search Report for French application No. FR1860561 dated Sep. 10, 2019.
Specification and drawing for U.S. Appl. No. 17/278,479 entitled Method for Producing Lead-212 From an Aqueous Solution Comprising Thorium-228 and Daughters Thereof, filed Mar. 22, 2021.

\* cited by examiner

METHOD FOR PREPARING AT LEAST ONE GENERATOR WITH A HIGH RADIUM-228 CONTENT

CROSS-REFERENCE TO RELATED APPLICATIONS

This is a National Stage application of PCT international application PCT/FR2019/052675, filed on Nov. 8, 2019, which claims the priority of French Patent Application No. 1860561, filed Nov. 15, 2018, both of which are incorporated herein by reference in their entirety.

TECHNICAL FIELD

The invention relates to the field of the production of radioactive isotopes, also known as radioisotopes.

More specifically, it relates to a method for preparing one or more generators with a high radium-228 content from an aqueous solution comprising thorium-232 and radium-228.

This or these generators can particularly serve to produce thorium-228 from which radium-224, then lead-212 and bismuth-212 can be obtained.

The method and the generator(s) that it allows preparing are therefore likely to find applications notably in the manufacture of radiopharmaceuticals based on lead-212 or bismuth-212, suitable for use in nuclear medicine and, in particular, in targeted alpha radiotherapy for cancer treatment.

Prior Art

Targeted alpha radiotherapy, also known as targeted alphatherapy, consists of injecting a radioactive isotope bound to a vector, such as an antibody, capable of very precisely targeting specific sites present on the surface of cancer cells. The energy emitted by the natural radioactive decay of the radioisotope then makes it possible to destroy cancer cells while limiting damage to surrounding healthy cells.

Some decay products of thorium-232 and, in particular, lead-212 and bismuth-212, which is the daughter radioisotope of lead-212, can be used in targeted alphatherapy, particularly in the treatment of pancreatic cancers, other intraperitoneal cancers and melanomas, diseases for which targeted alphatherapy has been the subject of preclinical tests, in particular in the USA.

As shown in appended FIG. 1 which represents the natural decay, or disintegration, chain of thorium-232 which includes lead-212 and bismuth-212:
- lead-212 can be produced by radioactive decay of radium-224,
- radium-224 can be produced by radioactive decay of thorium-228,
- thorium-228 can be produced by radioactive decay of radium-228, whereas
- radium-228 can be produced by radioactive decay of thorium-232 which represents the main constituent of natural thorium extracted from ores such as monazites or thorites.

The production of lead-212, radium-224 and thorium-228 can be carried out by means of what is known as a "generator", i.e. a liquid chromatography column which typically comprises a solid stationary phase whereon the parent radioisotope is fixed selectively and which is washed regularly with a liquid phase making it possible to elute the daughter radioisotope(s) which are formed by radioactive decay of the parent radioisotope.

To prepare a generator intended for the production of thorium-228 and comprising, therefore, radium-228 as a parent radioisotope, it is known to circulate an aqueous solution of a natural thorium salt comprising both thorium-232 and radium-228 in a column wherein the solid stationary phase is capable of retaining radium selectively with respect to thorium.

A stationary phase material capable of retaining radium selectively with respect to thorium is, for example, that offered by the company IBC Advanced Technologies, Inc., under the reference AnaLig™ Ra-01 for concentrating radiated aqueous solutions before analysis and for separating radium from interfering substances.

In theory, the quantity of radium-228 retained by the stationary phase of a chromatography column is expected to increase with the volume of thorium salt solution placed in circulation in this column within the limits, obviously, of the theoretical radium-228 retention capacity by the stationary phase material as indicated by the supplier of this material.

However, in practice, this is not the case since a decrease in the radium-228 retention yield by the stationary phase material occurs as the volume of thorium salt solution placed in circulation in the chromatography column increases, with, consequently, an increase in the quantity of radium-228 which is eluted together with thorium-232.

By way of example, for a chromatography column comprising 36 g of AnaLig™ Ra-01 particles, the Inventors observed that the radium-228 retention yield by these particles, which is initially 99%, is not more than about 50% after circulation in the chromatography column of 2200 L of a thorium salt solution (unpublished data).

Thus, the effective capacity of the stationary phase material, which corresponds to its actual ability to retain radium-228 under given operating conditions, is considerably less than its theoretical retention capacity as indicated by its supplier.

A consequence thereof is that, when the chromatography column is subsequently used as a thorium-228 generator, the production capacity of this generator is less than what it might be if the retention of radium-228 by the stationary phase were better. This results, on one hand, in the fact that the subsequent elutions of this generator that are carried out to retrieve thorium-228 lead to eluates which not only are less charged in available thorium-228 but wherein the latter is more diluted and, on the other hand, in the need to replace the generator more often.

Furthermore, radium-228 which is not retained by the stationary phase material when preparing the generator must be recycled, otherwise this radium is lost.

The Inventors therefore set themselves the aim of finding a solution for these problems.

More specifically, they set themselves the aim of successfully increasing the effective capacity of a stationary phase material capable of retaining radium selectively with respect to thorium, i.e. increasing the quantity of radium-228 retained by this material per unit of weight of material or, in other words, producing a generator with a high radium-228 content from a solution of thorium-232 and radium-228.

DISCLOSURE OF THE INVENTION

This aim is achieved by the invention which proposes a method for preparing at least one generator comprising radium-228 from an aqueous solution A1 comprising thorium-232 and radium-228, the method comprising the following steps:

a) circulating in a first chromatography column a volume V1 of aqueous solution A1, the first chromatography column comprising a first stationary phase consisting of a solid material which selectively retains radium with respect to thorium;

b) at least one washing of the first stationary phase with an aqueous solution A2;

c) eluting the radium-228 from the first stationary phase with a volume V3 of an aqueous solution A3 comprising an agent complexing radium-228, the volume V3 being between 0.005% and 1% and, preferably, between 0.01% and 1%, of the volume V1 of aqueous solution A1 having circulated in the first chromatography column, whereby an aqueous solution A4 which comprises radium-228 complexes is obtained;

d) dissociating the radium-228 complexes present in the aqueous solution A4 by modifying the pH of the aqueous solution A4, whereby an aqueous solution A5 comprising the decomplexed radium-228 is obtained;

e) loading a second chromatography column with the aqueous solution A5, the second chromatography column comprising a second stationary phase consisting of the same material as the first stationary phase; and f) washing at least once the second stationary phase with an aqueous solution A6, whereby said at least one generator is obtained.

According to the invention, the aqueous solution A1, which comprises thorium-232 and radium-228, is, preferably, an aqueous solution obtained from the dissolution in water of a salt of natural thorium, i.e. thorium extracted from a thorium ore such as a monazite or a thorite.

This natural thorium salt is preferably a thorium nitrate, in which case the aqueous solution A1 comprises nitric acid.

However, the natural thorium salt can also be a salt other than a nitrate such as a thorium chloride, in which case the aqueous solution A1 comprises hydrochloric acid.

According to the invention, the material constituting the first and second stationary phases can be any stationary phase material which is capable of retaining radium selectively with respect to thorium.

Such a material can comprise a solid substrate that is inorganic (such as silica or alumina particles or a silica gel), organic (such as a polymer) or inorganic-organic, which is functionalised, by grafting or impregnation, by organic molecules capable of retaining by ion exchange, molecular recognition or any other mechanism, the radium ions ($Ra^{2+}$) present in the aqueous solution A1 selectively from the thorium ions ($Th^{4+}$) also present in this aqueous solution.

It can particularly consist of a material which comprises silica particles grafted with molecules of an organic ligand of radium, for example an oxacryptand. One material which is particularly well suited to the implementation of the method according to the invention is, for example, that offered by the company IBC Advanced Technologies, Inc. under the reference AnaLig™ Ra-01.

The nitric acid content of the aqueous solution A1 is located, preferably, in the acidity range recommended by the supplier of the stationary phase material, for example from 0.01 mol/L to 4 mol/L of nitric acid for AnaLig™ Ra-01 particles.

The aqueous solution A2 is advantageously an acidic aqueous solution which comprises the same acid and the same acid concentration as the aqueous solution A1.

Therefore, it consists, preferably, of an aqueous solution comprising nitric acid, at a concentration from 0.01 mol/L to 4 mol/L, if the aqueous solution A1 itself has such a nitric acid concentration.

In step c), the radium-228 retained by the first stationary phase is eluted by means of an agent which will detach this radium-228 from the first stationary phase by complexation or chelation (both terms being considered here as synonymous).

According to the invention, this complexing or chelating agent is, preferably, an aminopolycarboxylic acid or an aminopolycarboxylic acid salt.

Thus, it can particularly consist of nitrilotriacetic acid (or NTA), ethylenediaminetetraacetic acid (or EDTA), diethylenetriaminepentaacetic acid (or DTPA) or of one of the salts thereof, preference being, however, given to EDTA and to the salts thereof such as the sodium salts thereof.

Therefore, the aqueous solution A3 is preferentially a solution which comprises EDTA or a salt thereof, at a concentration advantageously between 0.03 mol/L and 0.1 mol/L and, more preferably, equal to 0.09 mol/L of EDTA and whose pH is brought, preferably, to a value ranging from 10 to 11 by adding a strong base such as sodium hydroxide.

The eluate thus obtained—or aqueous solution A4—therefore comprises radium-228 but in a complexed form.

Therefore, step d) is intended to dissociate the radium-228 complexes present in the eluate with a view to being able, in step e), to load the second chromatography column with an aqueous solution comprising decomplexed or, in other words, free radium-228.

According to the invention, this dissociation is carried out by modifying the pH of the aqueous solution A4 so as to bring this pH to a value at which the ability of the complexing agent to complex radium-228 is reduced.

Thus, for example, if the complexing agent is EDTA or one of the salts thereof, the dissociation of the radium-228 complexes is carried out by acidifying the aqueous solution A4 to bring the pH of this solution to a value at least equal to 3 in order to prevent EDTA from precipitating and, preferably, at most equal to 5 so that the complexing power of EDTA with respect to radium-228 is sufficiently reduced. In this case, a preferred pH value is between 4 and 5.

This acidification can be carried out by simply adding an acid to the aqueous solution A4, which can be a weak acid such as acetic acid but is, preferably, a strong acid such as nitric acid, to limit the volume of acid to be added.

However, within the scope of the invention, the acidification of the aqueous solution A4 is, preferably, carried out by washing the first stationary phase with at least one acidic aqueous solution and by adding all or part of the aqueous solution issued from this washing to the aqueous solution A4.

More preferably, to acidify the aqueous solution A4, it is preferred to wash the first stationary phase twice:

a first time with a buffer solution such as a sodium acetate buffer solution, whose pH is at least equal to 3, preferably, at most equal to 5 and, ideally, equal to 4.5; and a second time with an acidic aqueous solution which comprises advantageously the same acid as the aqueous solutions A1 and A2 and which is therefore, preferably, an aqueous solution comprising nitric acid, at a concentration from 0.01 mol/L to 4 mol/L if the aqueous solutions A1 and A2 themselves have such a nitric acid concentration;

and to add all or part of the solutions issued from these two washings to the aqueous solution A4.

Indeed, it is advantageous to follow this procedure as this makes it possible not only to acidify the aqueous solution A4 but also, with the first washing, to remove the free EDTA as well as the $^{228}$Ra-EDTA complexes retained in the interstitial volume of the first stationary phase and, with the second washing, to recondition the first stationary phase with a view to subsequent reuse of this stationary phase.

When the acidification of the aqueous solution A4 is carried out by adding one or more solutions issued from the washing of the first stationary phase, then the method can comprise, between steps d) and e), a monitoring of the pH of the aqueous solution A5 resulting from this acidification and, if required, an adjustment of this pH to a value between 3 and 5 and, preferably, between 4 and 5.

In step e), the loading of the second chromatography column with the aqueous solution A5 consists of simply circulating this mixture in this column but which is preferably carried out at a low flow rate, for example from 1 mL/min to 5 mL/min, so as to favour the retention of radium-228 by the second stationary phase.

As mentioned above, once the second chromatography column is loaded with the aqueous solution A5, the second stationary phase contained in this column undergoes at least one washing with an aqueous solution A6 (step f) of the method), which aqueous solution A6 is, preferably, an acidic aqueous solution.

More preferably, the second stationary phase undergoes two washings:
- a first washing to remove the complexing agent present in the interstitial volume of the second stationary phase, which is carried out with a buffer solution such as a sodium acetate buffer solution, for example of pH at least equal to 3, preferably at most equal to 5 and, ideally, equal to 4.5 if the complexing agent is EDTA; and
- a second washing for conditioning the second stationary phase with a view to the subsequent use of the second chromatography column as a generator, for example of thorium-228, and which is carried out with an acidic aqueous solution comprising advantageously the same acid and the same acid concentration as the aqueous solutions A1, A2 and A3; this aqueous solution therefore comprises, preferably, nitric acid, at a concentration from 0.01 mol/L to 4 mol/L if the aqueous solutions A1, A2 and A3 themselves have such a nitric acid concentration.

According to the invention, step a) is, preferably, performed as long as the radium-228 retention yield by the first stationary phase is greater than or equal to a threshold value. In other words, step a) is stopped as soon as the radium-228 retention yield by the first stationary phase falls below this threshold value.

As a result, the volume V1 of aqueous solution A1 from step a) corresponds to the volume of aqueous solution A1 circulating in this column as long as the radium-228 retention yield by the first stationary phase is greater than or equal to the threshold value.

Preferably, this threshold value is 80% and, more preferably, 90%.

In a first preferred implementation of the method according to the invention, a single first chromatography column and a single second chromatography column are used, and:
- steps a) to d) are carried out n times by means of the first chromatography column, n being an integer greater than or equal to 2, typically between 2 and 10 and, more preferably, between 4 and 6, whereby n aqueous solutions A5 are produced which are collected separately or together to obtain a mixture of aqueous solutions A5;
- step e) of loading the second chromatography column is carried out with the n aqueous solutions A5 or the mixture of aqueous solutions A5; and
- step f) of washing the second stationary phase is carried out with the aqueous solution A6, whereby a single generator is obtained.

In a second preferred implementation of the invention, a single first chromatography column, m second chromatography columns and m second stationary phases are used, and:
- steps a) to d) are carried out n times by means of the first chromatography column, n being an integer greater than or equal to 3, typically between 3 and 10 and, more preferably, between 4 and 6, whereby n aqueous solutions A5 are produced which are collected separately or together to obtain a mixture of aqueous solutions A5;
- step e) of loading the m second columns is carried out with the n aqueous solutions A5 or the mixture of aqueous solutions A5, m being an integer greater than or equal to 2 but less than n; and
- step f) of washing the m second stationary phases is carried out with the aqueous solution A6, whereby m generators are obtained.

In a third preferred implementation of the method according to the invention, a single first chromatography column and a single second chromatography column are used, and:
- steps a) to c) are carried out n times by means of the first chromatography column, n being an integer greater than or equal to 2, typically between 2 and 10 and, more preferably, between 4 and 6, whereby n aqueous solutions A4 are produced which are collected separately;
- step d) is carried out by adding acid to the n aqueous solutions A4, whereby n aqueous solutions A5 are obtained;
- step e) of loading the second chromatography column is carried out with the n aqueous solutions A5; and
- step f) of washing the second stationary phase is carried out with the aqueous solution A6, whereby a single generator is obtained.

In a fourth preferred implementation of the method according to the invention, a single first chromatography column and a single second chromatography column are used, and:
- steps a) to c) are carried out n times by means of the first chromatography column, n being an integer greater than or equal to 2, typically between 2 and 10 and, more preferably, between 4 and 6, whereby n aqueous solutions A4 are produced which are collected together to obtain a mixture of aqueous solutions A4;
- step d) is carried out by adding acid to the mixture of aqueous solutions A4, whereby an aqueous solution A5 is obtained;
- step e) of loading the second chromatography column is carried out with the aqueous solution A5; and
- step f) of washing the second stationary phase is carried out with the aqueous solution A6, whereby a single generator is obtained.

In a fifth preferred implementation of the method according to the invention, a single first chromatography column, m second chromatography columns and m second stationary phases are used, and:
- steps a) to c) are carried out n times by means of the first chromatography column, n being an integer greater than or equal to 3, typically between 3 and 10 and, more preferably, between 4 and 6, whereby n aqueous solutions A4 are produced which are collected separately;

step d) is carried out by adding acid to the n aqueous solutions A4, whereby n aqueous solutions A5 are obtained;

step e) of loading the m second chromatography columns is carried out with the n aqueous solutions A5, m being an integer greater than or equal to 2 but less than n; and step f) of washing the m second stationary phases is carried out with the aqueous solution A6, whereby m generators are obtained.

In a sixth preferred implementation of the method according to the invention, a single first chromatography column, m second chromatography columns and m second stationary phases are used, and:

steps a) to c) are carried out n times by means of the first chromatography column, n being an integer greater than or equal to 3, typically between 3 and 10 and, more preferably, between 4 and 6, whereby n aqueous solutions A4 are produced which are collected together to obtain a mixture of aqueous solutions A4;

step d) is carried out by adding acid to the mixture of aqueous solutions A4, whereby an aqueous solution A5 is obtained;

step e) of loading the m second chromatography columns is carried out with the aqueous solution A5, m being an integer greater than or equal to 2 but less than n; and step f) of washing the m stationary phases is carried out with the aqueous solution A6, whereby m generators are obtained.

In a seventh preferred implementation of the method according to the invention, a single first chromatography column and a single second chromatography column are used, and:

steps a) to e) are carried out n times by means of the first and the second chromatography column, n being an integer greater than or equal to 2, typically between 2 and 10 and, more preferably, between 4 and 6; and step f) of washing the second stationary phase is carried out with the aqueous solution A6, whereby a single generator is obtained.

In an eighth preferred implementation of the method according to the invention, a single first chromatography column and a single second chromatography column are used, and:

a) to f) are carried out n times by means of the first and the second chromatography column, n being an integer greater than or equal to 2, typically between 2 and 10 and, more preferably, between 4 and 6, whereby a single generator is obtained after the n steps a) to f).

In a ninth preferred implementation of the method according to the invention, l first chromatography columns, l first stationary phases and a single second chromatography column are used, and:

steps a) to d) are carried out n times by means of the l first chromatography columns, n being an integer greater than or equal to 2, typically between 2 and 10 and, more preferably, between 4 and 6, and l being an integer greater than or equal to 2 but less than or equal to n, whereby n aqueous solutions A5 are produced which are collected separately or together to obtain a mixture of aqueous solutions A5;

step e) of loading the second chromatography column is carried out with the n aqueous solutions A5 or the mixture of aqueous solutions A5; and step f) of washing the second stationary phase is carried out with the aqueous solution A6, whereby a single generator is obtained.

In a tenth preferred implementation of the method according to the invention, l first chromatography columns, l first stationary phases and a single second chromatography column are used, and:

steps a) to c) are carried out n times by means of the l first chromatography columns, n being an integer greater than or equal to 2, typically between 2 and 10 and, more preferably, between 4 and 6, and l being an integer greater than or equal to 2 but less than or equal to n, whereby n aqueous solutions A4 are produced which are collected separately;

step d) is carried out by adding acid to the n aqueous solutions A4, whereby n aqueous solutions A5 are obtained;

step e) of loading the second chromatography column is carried out with the n aqueous solutions A5; and step f) of washing the second stationary phase is carried out with the aqueous solution A6, whereby a single generator is obtained.

In an eleventh preferred implementation of the method according to the invention, l first chromatography columns, l first stationary phases and a single second chromatography column are used, and:

steps a) to c) are carried out n times by means of the l first chromatography columns, n being an integer greater than or equal to 2, typically between 2 and 10 and, more preferably, between 4 and 6, and l being an integer greater than or equal to 2 but less than or equal to n, whereby n aqueous solutions A4 are produced which are collected together to obtain a mixture of aqueous solutions A4;

step d) is carried out by adding acid to the mixture of aqueous solutions A4, whereby an aqueous solution A5 is obtained;

step e) of loading the second chromatography column is carried out with the aqueous solution A5; and step f) of washing the second stationary phase is carried out with the aqueous solution A6, whereby a single generator is obtained.

In a twelfth preferred implementation of the method according to the invention, l first chromatography columns, l first stationary phases and a single second chromatography column are used, and:

steps a) toe) are carried out n times by means of the l first chromatography columns and the second chromatography column, n being an integer greater than or equal to 2, typically between 2 and 10 and, more preferably, between 4 and 6, and l being an integer greater than or equal to 2 but less than or equal to n, whereby a single second chromatography column is obtained; and step f) of washing the second stationary phase is carried out with the aqueous solution A6, whereby a single generator is obtained.

In a thirteenth preferred implementation of the method according to the invention, l first chromatography columns, l first stationary phases and a single second chromatography column are used, and:

steps a) to f) are carried out n times by means of the l first chromatography columns and the second chromatography column, n being an integer greater than or equal to 2, typically between 2 and 10 and, more preferably, between 4 and 6, and l being an integer greater than or equal to 2 but less than or equal to n, whereby a single second generator is obtained.

It will be noted that, when embodiments nine to thirteen are implemented with an integer l which is equal to n, then this means that, to carry out n times steps a) to c) or a) to d), a different first column is used each time.

Regardless of the implementation of the method according to the invention, the generator(s) obtained is (are) preferably intended to produce thorium-228.

Further features and advantages of the method according to the invention will emerge on reading the following supplementary description and which relates to two of the preferred implementations of this method.

Obviously, these implementations are merely given by way of illustrations of the subject matter of the invention, and in no way represent restrictions of this subject matter.

DETAILED DISCLOSURE OF SPECIFIC IMPLEMENTATIONS

Figure 2:
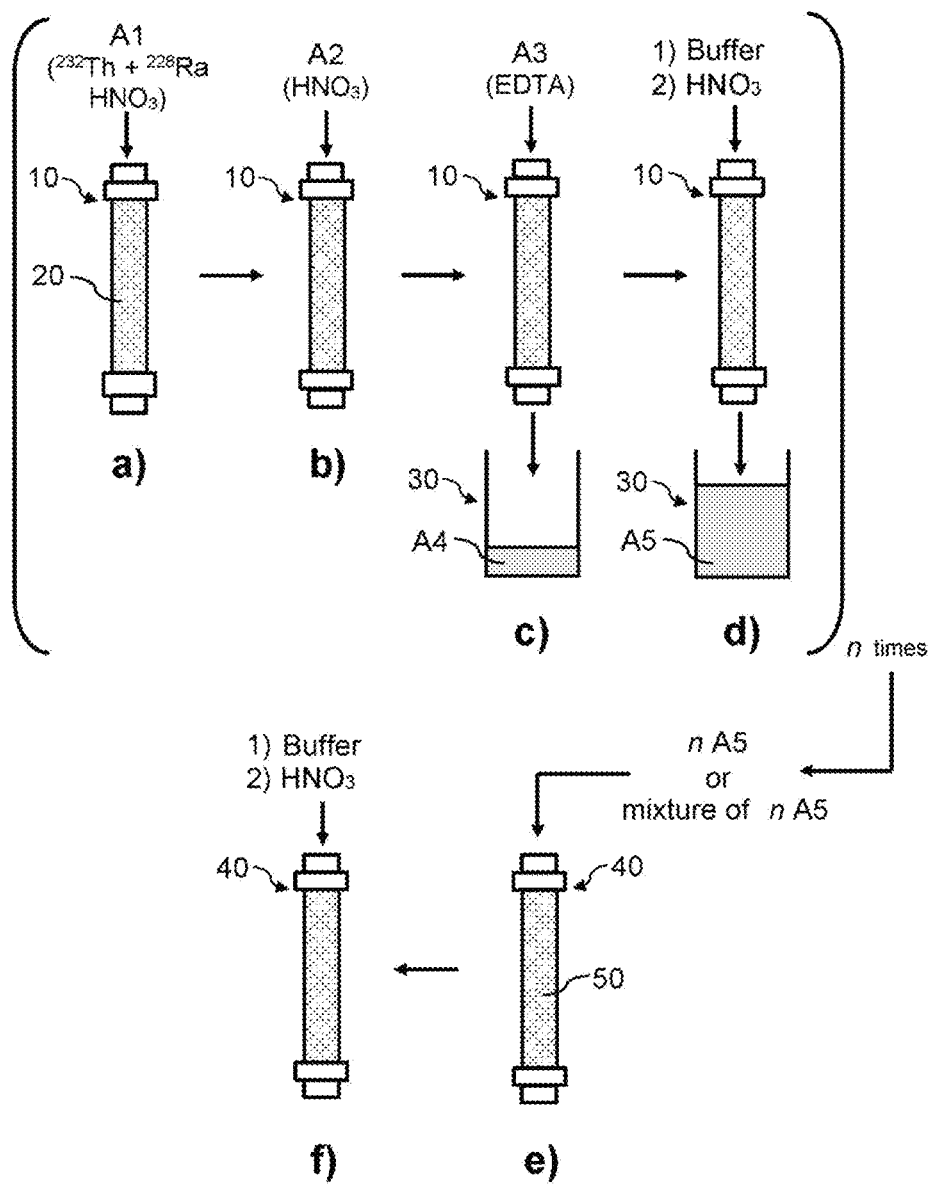
FIG. 2 schematically represents a first implementation of the method according to the invention.

Reference is firstly made to FIG. 2 which schematically represents a first implementation of the method according to the invention.

In this first implementation, the method is intended to prepare a single generator.

It firstly comprises carrying out n times, by means of a single first chromatography column 10 comprising a stationary phase 20, the following sequence of steps a) to d):
  a) circulating an aqueous solution A1 comprising thorium-232, radium-228 and nitric acid in the column 10 as long as the radium-228 retention yield by the stationary phase 20 is at least equal to a threshold value;
  b) when the radium-228 retention yield becomes less than the threshold value, a washing of the stationary phase 20 with an aqueous solution A2 comprising nitric acid to remove from the stationary phase 20 the thorium-232 present in the interstitial volume of this stationary phase;
  c) eluting the radium-228 from the stationary phase 20 with an aqueous solution A3 which comprises EDTA as a complexing agent, as well as collecting in a receptacle 30 the eluate, or aqueous solution A4, comprising radium-228 in the form of $^{228}$Ra-EDTA complexes; and
  d) dissociating the $^{228}$Ra-EDTA complexes with two successive washings of the stationary phase 20, the first with a buffer solution of acidic pH and the second with a nitric aqueous solution, and collecting the two washing solutions at the outlet thereof from the column 10 in the receptacle 30, whereby an aqueous solution A5 comprising decomplexed radium-228 is obtained;
n being an integer at least equal to 2, typically between 2 and 10 and, preferably equal to 4 or 5.

Steps c) and d) of the n sequences of steps a) to d) can be carried out using n receptacles 30, each receptacle serving for a single step c) and a single step d), in which case, after the final step d) of the n sequences of steps a) to d), n aqueous solutions A5 are obtained.

Alternatively, steps c) and d) of the n sequences of steps a) to d) can be carried out using a single receptacle 30, in which case, after the final step d) of the n sequences of steps a) to d), a mixture of n aqueous solutions A5 is obtained.

Then, the method comprises carrying out, by means of a single second chromatography column 40 comprising a stationary phase 50, the following two steps:
  e) loading the second column 40 with the n aqueous solutions A5 or with the mixture of n aqueous solutions A5 to fix on the stationary phase 50 the radium-228 contained in these solutions or this mixture; and
  f) two successive washings of the stationary phase 50, the first with a buffer solution of acid pH to remove EDTA from this stationary phase, and the second with an aqueous solution comprising nitric acid to condition the stationary phase 50 with a view to the subsequent use of the chromatography column 40 as a generator.

All the steps of the method, which are detailed hereinafter, are, preferably, performed at ambient temperature, i.e. at a temperature of 20° C. to 25° C.

*Step a):

The column 10 comprises a stationary phase 20 which consists of AnaLig™ Ra-01 particles. This stationary phase retains radium, regardless of the isotope, selectively with respect to thorium, regardless of the isotope.

By way of example, this column has a bed volume (or BV) of 78.54 mL and contains from 34 to 37 g of AnaLig™ Ra-01 particles.

Prior to carrying out the first step a) of the n sequences of steps, the stationary phase 20 is conditioned by percolating an aqueous solution comprising from 0.01 mol/L to 4 mol/L, preferably from 0.05 mol/L to 1 mol/L and, more preferably, 0.1 mol/L of nitric acid.

Once this conditioning has been performed, the column 10 is supplied with the aqueous solution A1 which is obtained from dissolving a natural thorium nitrate in water and which has a nitric acid content which is between 0.01 mol/L and 4 mol/L, preferably between 0.05 mol/L and 1 mol/L and, more preferably, 0.1 mol/L.

This aqueous solution contains radium-228 (for example, at a rate of 1 MBq/L), preferably at radioactive equilibrium with the thorium-232 from which it originates.

The column 10 is continuously supplied with aqueous solution, at a flow rate typically between 10 mL/min and 100 mL/min, as long as the radium-228 retention yield is greater than or equal to a threshold value which is, preferably, 80% and, more preferably, 90%.

When the radium-228 retention yield falls below the threshold value, then the supply of the column 10 is stopped.

The retention yield, referenced $R_T$, is calculated by determining the activity of radium-228 in samples of the aqueous solution A1 which are taken at the entry and exit thereof from the column 10 and by applying the following formula:

$$R_T = \frac{A_{ini} - A_{fin}}{A_{ini}} \times 100$$

where:
  $A_{ini}$: activity of radium-228 in the aqueous solution A1 at its entry into the column 10, expressed in MBq;
  $A_{fin}$: activity of radium-228 in the aqueous solution A1 at its exit from the column 10, expressed in MBq.

As known per se, the activity of radium-228 is determined indirectly, namely it is calculated from the activity exhibited by its daughter, actinium-228, at the end of a period of 4 days after taking the samples, the activity of actinium-228 being itself measured directly in the samples by gamma spectrometry.

*Step b):

The washing of the stationary phase 20 is carried out by circulating in the column 10 several BVs, for example 15 BVs, of aqueous solution A2, which comprises from 0.01 mol/L to 4 mol/L, preferably from 0.05 mol/L to 1 mol/L and, more preferably, 0.1 mol/L of nitric acid, at a flow rate, for example, of 40 mL/min.

*Step c):

The elution of the radium-228 from the stationary phase 20 is carried out by circulating in the column 10 the aqueous solution A3 which comprises from 0.03 mol/L to 0.1 mol/L and, preferably, 0.09 mol/L of EDTA and whose pH is brought to a value preferably from 10 to 11 by adding a strong base such as sodium hydroxide.

The number of BVs of aqueous solution A3, which are placed in circulation in the column 10, is selected in such a way that it corresponds to a volume of aqueous solution A3 between 0.005% and 1% and, preferably, between 0.01% and 1% of the volume of aqueous solution A1 having circulated in this column during step a), to obtain a concentrating elution of radium-228, i.e. an elution of radium-228 which gives rise to an aqueous solution A4 wherein the activity of radium-228 is at least 100 times higher than that of radium-228 in the aqueous solution A1.

Thus, for example, for a volume of 1000 L to 1200 L of aqueous solution A1 having circulated in the column 10, the elution of radium-228 is carried out with a number of BVs of aqueous solution A3 corresponding to a volume between 50 mL and 12 L, preferably between 250 mL and 12 L, i.e., for example, 6 BVs for a column 10 having a BV of 78.54 mL.

For optimal elution, the aqueous solution A3 is, preferably, placed in circulation in the column 10 in two steps. Thus, for example, for 6 BVs, 2 BVs are first used at a flow rate of 10 mL/min, then, after a break of 20 minutes, the remaining 4 BVs are used at a flow rate of 5 mL/min.

However, it is completely possible to circulate the aqueous solution A3 in the column 10 continuously (i.e. without envisaging a break) and/or at a single flow rate, this flow potentially ranging from 1 mL/min to 30 mL/min.

On the other hand, it is important to keep the pH of the aqueous solution A3 at a value at most equal to 11 to minimise the risks of dissolving the silica particles forming the solid substrate of the stationary phase 20.

*Step d):

As stated above, this step consists of subjecting the stationary phase 20 to two successive washings and of collecting the solutions obtained from these two washings in the receptacle 30 wherein in step c) the eluate, or aqueous solution A4, comprising radium-228 in the form of $^{228}$Ra-EDTA complexes has been collected.

The first washing, which makes it possible to remove from the stationary phase 20 the free EDTA as well as the $^{228}$Ra-EDTA complexes retained in the interstitial volume of this stationary phase, is carried out by circulating in the column 10 several BVs, for example 5 BVs, of a buffer solution whose pH is at least equal to 3 to prevent EDTA from precipitating inside the column 10 and at most equal to 5.

This buffer solution is, for example, a sodium acetate buffer solution of pH 4.5. The second washing, which itself makes it possible to recondition the stationary phase 20 with a view to the reuse thereof in the implementation of the following sequence of steps a) to d), is carried out by circulating in the column 10 several BVs, for example 5 BVs, of a nitric aqueous solution whose acidity enables a purification of the stationary phase 20 but without the addition of the solution obtained from this second washing to the mixture already present in the receptacle 30 lowering the pH of this mixture below 3 to prevent EDTA from precipitating.

Therefore, this nitric aqueous solution has, preferably, a nitric acid content from 0.1 mol/L to 1 mol/L and, more preferably, 0.1 mol/L.

The circulation rates of the buffer solution and the nitric aqueous solution in the column 10 are advantageously 10 mL/min but can range from 1 mL/min to 60 mL/min.

The collection of the solutions from these two washings is carried out under stirring such that the washing solutions are mixed with the eluate as they are collected and, thus, acidifying this eluate.

This makes it possible to lower the complexing power of EDTA with respect to radium-228 and, thereby, obtain an aqueous solution A5 wherein radium-228 is decomplexed.

*Step e):

The chromatography column 40 is, preferably, a column fully identical to the column 10, with the same BV and the same mass quantity of Analig™ Ra-01 particles.

Before carrying out step e), the stationary phase 50 is conditioned by percolating a solution of a buffer solution whose pH is at least equal to 3 to prevent the EDTA present in the n aqueous solutions A5 (if n receptacles 30 were used during steps c) and d) of the n sequences of steps a) to d)) or the mixture of aqueous solutions A5 (if a single receptacle 30 was used during the n sequences of steps a) to d)) from precipitating inside the column 40 and at most equal to 5.

This buffer solution is, for example, a sodium acetate buffer solution of pH 4.5.

Once this conditioning has been performed, and after an optional adjustment of the pH to a value at least equal to 3 and, preferably, at most equal to 5, and ideally from 4 to 5, of the n aqueous solutions A5 or of the mixture of aqueous solutions A5, the column 40 is loaded with the n aqueous solutions A5 or the mixture thereof.

This loading is carried out by circulating in this column the n aqueous solutions A5 (injected into the column one after the other) or the mixture of aqueous solutions A5, at a low flow rate, for example from 1 mL/min to 5 mL/min, to favour the retention of radium-228 by the Analig™ Ra-01 particles.

*Step f):

As stated above, this step consists of subjecting the stationary phase 50 to two successive washings, the first with a buffer solution of pH between 3 and 5 and the second with a nitric aqueous solution.

The first washing, which makes it possible to remove from the stationary phase 50 the free EDTA retained in the interstitial volume of this stationary phase, is carried out by circulating in the column 40 several BVs, for example 2.5 BVs, of a buffer solution whose pH is at least equal to 3 to prevent, once again, EDTA from precipitating inside the column 40 and at most equal to 5 to prevent the interstitial EDTA from recomplexing the radium-228.

As in the case of the first washing of step d), this buffer solution is, for example, a sodium acetate buffer solution of pH 4.5.

The second washing, which makes it possible to condition the stationary phase 50, is carried out by circulating in the column 40 several BVs, for example 3 BVs, of a weakly concentrated aqueous nitric acid solution such as an aqueous solution comprising from 0.1 mol/L to 1 mol/L and, preferably, 0.1 mol/L of nitric acid.

The circulation rates of the buffer solution and the aqueous nitric acid solution in the column 40 are advantageously 5 mL/min but can range from 1 mL/min to 5 mL/min.

Figure 3:
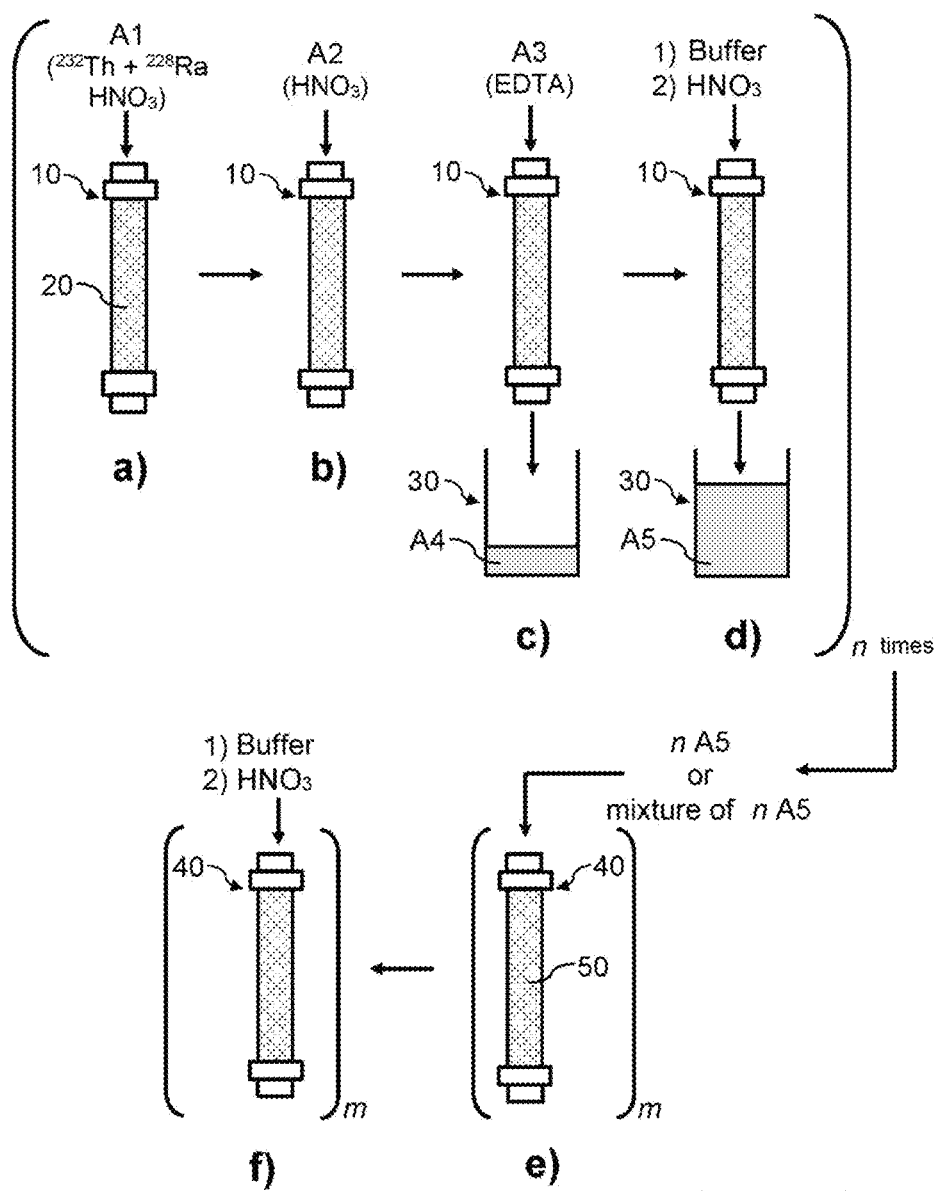
FIG. 3 schematically represents a second implementation of the method according to the invention.

Reference is now made to FIG. 3 which represents a second implementation of the method according to the invention.

Figure 1:
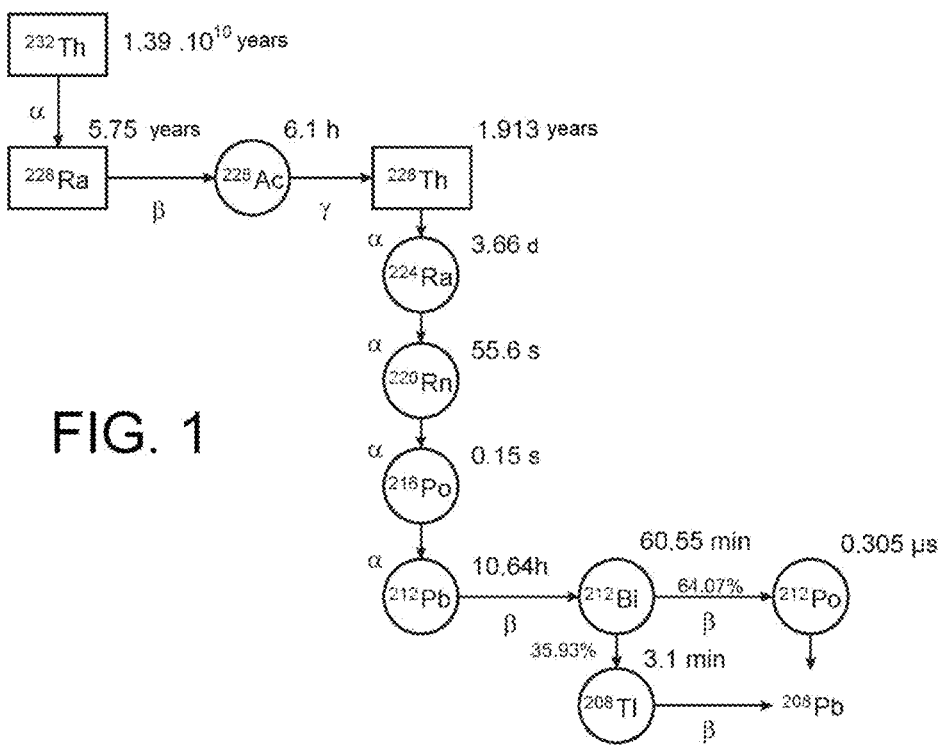
FIG. 1, previously described, represents the radioactive decay chain of thorium-232.

This implementation, which is intended to prepare a plurality of generators, only differs from that illustrated in FIG. 1 in that:
- the number of sequences of steps a) to d) is greater than or equal to 3, typically between 3 and 10 and, more preferably, between 4 and 6;
- steps e) and f) are carried out with m second columns 40, m being an integer greater than or equal to 2 but less than the number n of sequences of steps a) to d).

Thus, step e) comprises loading the m second columns 40 with the n aqueous solutions A5 or with the mixture of aqueous solutions A5 obtained after step d) of the last of the n sequences of steps a) to d) with, preferably, an equitable distribution, i.e. with equal fractions, of the n aqueous solutions A5 or of the mixture of aqueous solutions A5 between the m second columns 40.

Step f) then comprises two successive washings of each of the m stationary phases 50, the first with a buffer solution of acid pH to remove from the stationary phases 50 the free EDTA retained in these stationary phases, and the second with an aqueous solution comprising nitric acid to condition the second stationary phases 50 with a view to the subsequent use of the m second chromatography columns 40 as generators.

Example of Implementation of the Method According to the Invention

The method according to the invention was implemented according to the thirteenth implementation described in "Disclosure of the invention", to provide a single generator containing radium-228.

The following were used in this example:
- three first columns 10 (i.e. l equal to 3) and a single second column 40 each having a BV of 78.54 mL and each comprising between 34 g and 37 g of Analig™ Ra-01 particles;
- one receptacle 30 per first column 10 (i.e. in total three receptacles 30); and
- the following operating parameters:
  - number n of times when sequences a) to f) were carried out: 3, with for each sequence:
  - step a): circulation in one of the first columns 10 of 1200 L of an aqueous solution A1 containing 1 MBq/L of radium-228 (i.e. 1200 MBq for the 1200 L) and 0.1 mol/L of nitric acid, at a mean flow rate of 35 mL/min; then
  - step b): circulation in one of the first columns 10 of 15 BVs of an aqueous solution A2 containing 0.1 mol/L of nitric acid, at a flow rate of 40 mL/min; then
  - step c): circulation in one of the first columns 10 of an aqueous solution A3 containing 0.09 mol/L of EDTA and of pH 10-11, according to the following sequence: 2 BVs, at a flow rate of 10 mL/min—break of 20 minutes—4 BVs, at a flow rate of 5 mL/min; then
  - step d): circulation in one of the first columns 10 of 5 BVs of a sodium acetate buffer solution of pH 4.5, at a flow rate of 10 mL/min, then of 5 BVs of an aqueous solution comprising 0.1 mol/L nitric acid, at a flow rate of 10 mL/min so as to collect 16 BVs of solution A5 containing decomplexed radium-228 in each receptacle 30;
  - step e): circulation in the single second column 40 of the 16 BVs collected in each of the receptacle 30 after step d), at a flow rate of 5 mL/min;
  - step f): circulation in the second column 40 of 2.5 BVs of a sodium acetate buffer solution of pH 4.5, at a flow rate of 5 mL/min, then of 3 BVs of an aqueous solution containing 0.1 mol/L nitric acid, at a flow rate of 5 mL/min.

After the two reiterations of steps a) to f), a column 40 comprising 82 MBq of radium-228 per g of AnaLig™ Ra-01 particles, i.e. in total 3018 MBq of radium-228, was obtained.

This means that the effective capacity of the AnaLig™ Ra-01 particles forming the stationary phase 50 was increased by a factor of 2.5 with respect to the effective capacity of the AnaLig™ Ra-01 particles forming the stationary phases 20.

What is claimed is:

1. A method for preparing at least one generator comprising radium-228 from an aqueous solution A1 comprising thorium-232 and radium-228, comprising at least the steps of:
   a) circulating a volume V1 of the aqueous solution A1 in a first chromatography column comprising a first stationary phase consisting of a solid material which selectively retains radium with respect to thorium for as long as a radium-228 retention yield by the first stationary phase is greater than or equal to a threshold value;
   b) washing at least once the first stationary phase with an aqueous solution A2;
   c) eluting the radium-228 from the first stationary phase with a volume V3 of an aqueous solution A3 comprising an agent complexing radium-228, the volume V3 being between 0.005% and 1% of the volume V1 of the aqueous solution A1 having circulated in the first chromatography column, whereby an aqueous solution A4 which comprises radium-228 complexes is obtained;
   d) dissociating the radium-228 complexes present in the aqueous solution A4 by modifying a pH of the aqueous solution A4, whereby an aqueous solution A5 comprising the radium-228 in a decomplexed form is obtained;
   e) loading a second chromatography column with the aqueous solution A5, the second chromatography column comprising a second stationary phase consisting of a same material as the first stationary phase; and
   f) washing at least once the second stationary phase with an aqueous solution A6, whereby the at least one generator is obtained.

2. The method of claim 1, wherein the aqueous solution A1 is a solution obtained from dissolving a natural thorium salt in water.

3. The method of claim 1, wherein the aqueous solution A1 comprises from 0.01 mol/L to 4 mol/L of nitric acid.

4. The method of claim 1, wherein the aqueous solution A2 is an acidic aqueous solution comprising from 0.01 mol/L to 4 mol/L of nitric acid.

5. The method of claim 1, wherein the agent complexing radium-228 is an aminopolycarboxylic acid or an aminopolycarboxylic acid salt.

6. The method of claim 5, wherein the aminopolycarboxylic acid is nitrilotriacetic acid, ethylenediaminetetraacetic acid or diethylenetriaminepentaacetic acid.

7. The method of claim 1, wherein the aqueous solution A3 comprises from 0.03 mol/L to 1 mol/L of ethylenediaminetetraacetic acid or a salt thereof and has a pH of 10 to 11.

8. The method of claim 1, wherein step d) comprises an acidification of the aqueous solution A4 to bring the pH of the aqueous solution A4 to a value of 3 to 5.

9. The method of claim 8, wherein step d) comprises at least one washing of the first stationary phase with an acidic aqueous solution and an addition of all or part of the aqueous solution issued from the washing to the aqueous solution A4.

10. The method of claim 9, wherein step d) comprises:
a first washing of the first stationary phase with a buffer solution having a pH of 3 to 5; and
a second washing of the first stationary phase with an acidic aqueous solution comprising from 0.1 mol/L to 4 mol/L of nitric acid;
and an addition of all or part of the solutions issued from the first and second washings to the aqueous solution A4.

11. The method of claim 8, wherein step d) comprises an addition of an acid to the aqueous solution A4.

12. The method of claim 1, wherein the aqueous solution A5 has a pH of 3 to 5.

13. The method of claim 1, wherein step f) comprises:
a first washing of the second stationary phase with a buffer solution having a pH at least equal to 3; and
a second washing of the second stationary phase with an acidic aqueous solution.

14. The method of claim 1, wherein the threshold value is 80%.

15. The method of claim 1, wherein a single first chromatography column and a single second chromatography column are used, and wherein:
steps a) to d) are carried out n times by means of the first chromatography column, n being an integer greater than or equal to 2, whereby n aqueous solutions A5 are produced which are collected separately or together to obtain a mixture of aqueous solutions A5;
step e) of loading the second chromatography column is carried out with the n aqueous solutions A5 or the mixture of aqueous solutions A5; and
step f) of washing the second stationary phase is carried out with the aqueous solution A6, whereby a single generator is obtained.

16. The method of claim 1, wherein a single first chromatography column, m second chromatography columns and m second stationary phases are used, and wherein:
steps a) to d) are carried out n times by means of the first chromatography column, n being an integer greater than or equal to 3, whereby n aqueous solutions A5 are produced which are collected separately or together to obtain a mixture of aqueous solutions A5;
step e) of loading the m second columns is carried out with the n aqueous solutions A5 or the mixture of aqueous solutions A5, m being an integer greater than or equal to 2 but less than n; and
step f) of washing the m second stationary phases is carried out with the aqueous solution A6, whereby m generators are obtained.

17. The method of claim 1, wherein a single first chromatography column and a single second chromatography column are used, and wherein:
steps a) to c) are carried out n times by means of the first chromatography column, n being an integer greater than or equal to 2, whereby n aqueous solutions A4 are produced which are collected separately;
step d) is carried out by adding acid to the n aqueous solutions A4, whereby n aqueous solutions A5 are obtained;
step e) of loading the second chromatography column is carried out with the n aqueous solutions A5; and
step f) of washing the second stationary phase is carried out with the aqueous solution A6, whereby a single generator is obtained.

18. The method of claim 1, wherein a single first chromatography column and a single second chromatography column are used, and wherein:
steps a) to c) are carried out n times by means of the first chromatography column, n being an integer greater than or equal to 2, whereby n aqueous solutions A4 are produced which are collected together to obtain a mixture of aqueous solutions A4;
step d) is carried out by adding acid to the mixture of aqueous solutions A4, whereby an aqueous solution A5 is obtained;
step e) of loading the second chromatography column is carried out with the aqueous solution A5; and
step f) of washing the second stationary phase is carried out with the aqueous solution A6, whereby a single generator is obtained.

19. The method of claim 1, wherein a single first chromatography column, m second chromatography columns and m second stationary phases are used, and wherein:
steps a) to c) are carried out n times by means of the first chromatography column, n being an integer greater than or equal to 3, whereby n aqueous solutions A4 are produced which are collected separately;
step d) is carried out by adding acid to the n aqueous solutions A4, whereby n aqueous solutions A5 are obtained;
step e) of loading the m second chromatography columns is carried out with the n aqueous solutions A5, m being an integer greater than or equal to 2 but less than n; and
step f) of washing the m second stationary phases is carried out with the aqueous solution A6, whereby m generators are obtained.

20. The method of claim 1, wherein a single first chromatography column, m second chromatography columns and m second stationary phases are used, and wherein:
steps a) to c) are carried out n times by means of the first chromatography column, n being an integer greater than or equal to 3, whereby n aqueous solutions A4 are produced which are collected together to obtain a mixture of aqueous solutions A4;
step d) is carried out by adding acid to the mixture of aqueous solutions A4, whereby an aqueous solution A5 is obtained;
step e) of loading the m second chromatography columns is carried out with the aqueous solution A5, m being an integer greater than or equal to 2 but less than n; and
step f) of washing the m stationary phases is carried out with the aqueous solution A6, whereby m generators are obtained.

21. The method of claim 1, wherein l first chromatography columns, l first stationary phases and a single second chromatography column are used, and wherein:
steps a) to d) are carried out n times by means of the l first chromatography columns, n being an integer greater than or equal to 2 and l being an integer greater than or equal to 2 but less than or equal to n, whereby n aqueous solutions A5 are produced which are collected separately or together to obtain a mixture of aqueous solutions A5;

step e) of loading the second chromatography column is carried out with the n aqueous solutions A5 or the mixture of aqueous solutions A5; and step f) of washing the second stationary phase is carried out with the aqueous solution A6, whereby a single generator is obtained.

22. The method of claim 1, wherein l first chromatography columns, l first stationary phases and a single second chromatography column are used, and wherein:

steps a) to c) are carried out n times by means of the l first chromatography columns, n being an integer greater than or equal to 2, and l being an integer greater than or equal to 2 but less than or equal to n, whereby n aqueous solutions A4 are produced which are collected separately or together to obtain a mixture of aqueous solutions A4;

step d) is carried out by adding acid to the n aqueous solutions A4 or to the mixture of aqueous solutions A4, whereby n aqueous solutions A5 are obtained;

step e) of loading the second chromatography column is carried out with the n aqueous solutions A5; and step f) of washing the second stationary phase is carried out with the aqueous solution A6, whereby a single generator is obtained.

\* \* \* \* \*